US012505547B1

(12) United States Patent
Wang et al.

(10) Patent No.: US 12,505,547 B1
(45) Date of Patent: Dec. 23, 2025

(54) METHOD AND APPARATUS FOR IDENTIFYING VULNERABLE CORONARY PLAQUE BASED ON MULTIMODAL LARGE LANGUAGE MODEL (MM-LLM)

(71) Applicants: Peking Union Medical College Hospital, Beijing (CN); Beijing United Imaging Research Institute of Intelligent Imaging, Beijing (CN)

(72) Inventors: Yining Wang, Beijing (CN); Yan Yi, Beijing (CN); Yue Sun, Beijing (CN); Keting Xu, Beijing (CN); Zhen Qian, Beijing (CN); Shuaikun Wang, Beijing (CN)

(73) Assignees: PEKING UNION MEDICAL COLLEGE HOSPITAL, Beijing (CN); BEIJING UNITED IMAGING RESEARCH INSTITUTE OF INTELLIGENT IMAGING, Beijing (CN)

( * ) Notice: Subject to any disclaimer, the term of this patent is extended or adjusted under 35 U.S.C. 154(b) by 54 days.

(21) Appl. No.: 19/021,293

(22) Filed: Jan. 15, 2025

(51) Int. Cl.
 G06T 7/00 (2017.01)
 G06T 3/067 (2024.01)

(52) U.S. Cl.
 CPC ............ G06T 7/0012 (2013.01); G06T 3/067 (2024.01); *G06T 2207/10081* (2013.01);
 (Continued)

(58) Field of Classification Search
 CPC ......... G06T 7/0012; G06T 2207/30048; G06T 2207/30101; G06T 2207/10081;
 (Continued)

(56) References Cited

U.S. PATENT DOCUMENTS 10,478,130 B2 * 11/2019 Sharma .................. A61B 5/021

FOREIGN PATENT DOCUMENTS

| CN | 110074756 A | 8/2019 |
| CN | 110222759 A | 9/2019 |

(Continued)

OTHER PUBLICATIONS

C. Pohl et al., "Interdisciplinary approach to multimodal image fusion for vulnerable plaque detection," 2014 IEEE Conference on Biomedical Engineering and Sciences (IECBES), Kuala Lumpur, Malaysia, 2014, pp. 11-16, doi: 10.1109/IECBES.2014.7047466 (Year: 2014).*

(Continued)

*Primary Examiner* — Courtney Joan Nelson
(74) *Attorney, Agent, or Firm* — Bayramoglu Law Offices LLC

(57) ABSTRACT

A method and apparatus for identifying a vulnerable coronary plaque based on a multimodal large language model (MM-LLM) are provided. The method includes: acquiring a target 3D coronary computed tomography angiography (CCTA) image and a target straightened curved planar reformation (SCPR) image; acquiring plaque mask information of a blood vessel based on the target SCPR image; acquiring basic plaque data based on the plaque mask information; acquiring fluid dynamics data of each plaque area based on the SCPR image; acquiring basic clinical testing information; standardizing above image data, structural data, and textual data separately, and performing, by a regression mapping network, feature fusion to acquire a first fusion feature; acquiring a trained vulnerable plaque identification LLM; and inputting the first fusion feature into the vulnerable plaque identification LLM to acquire an identification result. The method solve problems of poor single- (Continued)

image feature expression ability and low identification performance in traditional technologies.

8 Claims, 2 Drawing Sheets

(52) U.S. Cl.
CPC .............. *G06T 2207/20048* (2013.01); *G06T 2207/20081* (2013.01); *G06T 2207/30101* (2013.01)

(58) Field of Classification Search
CPC .............. G06T 2207/30196; G06T 7/11; G06T 2207/20081; G06T 2207/30104; G06T 7/12; G06T 2210/41; G06T 7/10; G06T 2211/404; G06T 5/50; G06T 2207/20036; G06T 7/13; G06T 3/067; G06T 2207/20048; A61B 6/032; A61B 6/504; A61B 2576/02; A61B 8/13; A61B 8/0891; A61B 6/503; A61B 6/5217; A61B 6/5211; A61B 5/02007; A61B 6/03; G16H 30/40; G16H 30/20; G16H 50/30; G16H 50/20; G06F 16/3344; G06V 10/82; G06V 10/25; G06N 3/08; G06N 3/0464

See application file for complete search history.

(56) References Cited

FOREIGN PATENT DOCUMENTS

| | | | |
|---|---|---|---|
| CN | 113486990 | A | 10/2021 |
| CN | 114387464 | A | 4/2022 |
| CN | 116977352 | A | 10/2023 |
| CN | 117198514 | B | * 1/2024 |

OTHER PUBLICATIONS

Machine translation from google patents of CN-117198514-B (Year: 2024).*

* cited by examiner

METHOD AND APPARATUS FOR IDENTIFYING VULNERABLE CORONARY PLAQUE BASED ON MULTIMODAL LARGE LANGUAGE MODEL (MM-LLM)

TECHNICAL FIELD

The present disclosure relates to the technical field of image identification, and in particular to a method for identifying a vulnerable coronary plaque based on a multimodal large language model (MM-LLM) and an apparatus for identifying a vulnerable coronary plaque based on an MM-LLM.

BACKGROUND

Acute coronary syndrome (ACS) is a source of high mortality and accounts for a significant proportion of cardiovascular disease deaths. Research shows that nearly 70% of ACS is caused by the rupture of vulnerable plaques. Coronary computed tomography angiography (CCTA) is a recognized non-invasive imaging method for diagnosing coronary arteries and is currently an important method for early screening and definitive diagnosis of coronary heart disease in clinical practice. CCTA can be used to identify coronary plaques and assess the degree of coronary artery stenosis. However, in current clinical applications and diagnostic reports, CCTA assessment mainly focuses on luminal stenosis and does not have sufficient capability to assess the risk of vulnerable plaques. Vulnerable plaques include four signs, namely positive remodeling, low density, napkin ring, and spotty calcification. When two or more signs are present, they are considered vulnerable plaques. The reason for the insufficient risk assessment capability of CCTA for vulnerable plaques may be that doctors need to subjectively interpret the characteristics of vulnerable plaques, and the complex feature assessment and the time-consuming and labor-intensive diagnostic process put forward high professional requirements for doctors. There are many studies on CCTA-based detection of coronary plaques internationally. Maj et al. used a recurrent convolutional neural network (RCNN) to detect coronary plaques and distinguish between calcified, non-calcified, and mixed plaques based on spatial distribution results acquired. The accuracy of the model for detecting and characterizing coronary plaques is acceptable, but the reliability of the model is not high.

Therefore, a technical solution is needed to overcome or at least alleviate at least one of the aforementioned shortcomings of the prior art.

SUMMARY

In order to overcome or at least alleviate at least one of the above shortcomings of the prior art, an objective of the present disclosure is to provide a method for identifying a vulnerable coronary plaque based on a multimodal large language model (MM-LLM).

In order to achieve the above objective, the present disclosure provides a method for identifying a vulnerable coronary plaque based on a multimodal large language model (MM-LLM). The method for identifying a vulnerable coronary plaque based on an MM-LLM includes:

acquiring a target three-dimensional (3D) coronary computed tomography angiography (CCTA) image and a target straightened curved planar reformation (SCPR) image;

acquiring plaque mask information of a blood vessel based on the target SCPR image;

acquiring basic plaque data based on the plaque mask information;

acquiring fluid dynamics data of each plaque area based on the SCPR image;

acquiring basic clinical testing information;

standardizing above image data, structural data, and textual data separately, and performing, by a multimodal feature implicit spatial fusion method, feature fusion to acquire a first fusion feature;

acquiring a trained vulnerable plaque identification LLM; and inputting the first fusion feature into the vulnerable plaque identification LLM to acquire an identification result.

Optionally, the acquiring a trained vulnerable plaque identification LLM includes:

acquiring a pre-trained vulnerable plaque identification LLM; and fine-tuning the pre-trained vulnerable plaque identification LLM to acquire the trained vulnerable plaque identification LLM.

Optionally, the fine-tuning the pre-trained vulnerable plaque identification LLM to acquire the trained vulnerable plaque identification LLM includes:

acquiring a 3D CCTA image, SCPR image, and plaque mask information for training;

acquiring basic plaque data and fluid dynamics data for training;

acquiring basic clinical testing information data for training;

preprocessing the 3D CCTA image, SCPR image, and plaque mask information for training separately to acquire a first feature vector;

performing second preprocessing on the basic plaque data and fluid dynamics data for training separately to acquire a second feature vector;

preprocessing the basic clinical testing information data for training to acquire a third feature vector; and fine-tuning the pre-trained vulnerable plaque identification LLM based on the first feature vector, the second feature vector, and the third feature vector.

Optionally, the preprocessing the 3D CCTA image, SCPR image, and plaque mask information for training separately to acquire a first feature vector includes:

formatting the 3D CCTA image, SCPR image, and plaque mask information separately to acquire formatted images for training;

normalizing each of the formatted images for training to form a normalized image; and performing feature extraction on the normalized image to acquire the first feature vector.

Optionally, the performing second preprocessing on the basic plaque data and fluid dynamics data for training separately to acquire a second feature vector includes:

cleaning the basic plaque data and fluid dynamics data for training separately to acquire cleaned data;

normalizing the cleaned data to acquire normalized data; and encoding the normalized data to acquire the second feature vector.

Optionally, the preprocessing the basic clinical testing information data for training to acquire a third feature vector includes:

converting, by a Tokenizer class tool in a Transformers library, the basic clinical testing information data for training into a token combination; and performing, by an encoder, feature extraction on the token combination to acquire the third feature vector.

Optionally, the fine-tuning the pre-trained vulnerable plaque identification LLM based on the first feature vector, the second feature vector, and the third feature vector includes:

fusing, by an implicit spatial encoding network, the first feature vector, the second feature vector, and the third feature vector to generate a fourth feature vector;
acquiring a regression mapping network;
training the regression mapping network based on the fourth feature vector to acquire a trained regression mapping network;
acquiring diagnostic result data;
performing feature extraction on the diagnostic result data to acquire a fifth feature vector; and
fine-tuning the pre-trained vulnerable plaque identification LLM based on the fourth feature vector and the fifth feature vector.

Optionally, the fine-tuning the pre-trained vulnerable plaque identification LLM based on the fourth feature vector and the fifth feature vector includes:

performing multiple rounds of training in advance on the pre-trained vulnerable plaque identification LLM based on the fourth feature vector;
freezing, after completing the multiple rounds of training in advance, a parameter of a fusion module according to a preset step;
comparing the fourth feature vector with the fifth feature vector to train the vulnerable plaque identification LLM, thereby acquiring the trained vulnerable plaque identification LLM.

The present disclosure further provides an apparatus for identifying a vulnerable coronary plaque based on an MM-LLM. The apparatus for identifying a vulnerable coronary plaque based on an MM-LLM includes:

an image acquisition module, configured to acquire a target 3D CCTA image and a target SCPR image;
a plaque mask identification module, configured to acquire plaque mask information of a blood vessel based on the target SCPR image;
a basic plaque identification module, configured to acquire basic plaque data based on the plaque mask information;
a fluid dynamics data acquisition module, configured to acquire fluid dynamics data of each plaque area based on the SCPR image;
a basic clinical testing information acquisition module, configured to acquire basic clinical testing information;
a first fusion data acquisition module, configured to standardize image data, structural data, and textual data separately, and perform, by a multimodal feature implicit spatial fusion method, feature fusion to acquire a first fusion feature;
a vulnerable plaque identification LLM acquisition module, configured to acquire a trained vulnerable plaque identification LLM; and
an identification result identification module, configured to input the first fusion feature into the vulnerable plaque identification LLM to acquire an identification result.

In the present disclosure, the method for identifying a vulnerable coronary plaque based on an MM-LLM integrates a plaque feature, a fluid dynamics feature, and a text feature to solve the problems of poor single-image feature expression ability and low identification performance in traditional technologies.

DETAILED DESCRIPTION OF THE EMBODIMENTS

Figure 1:
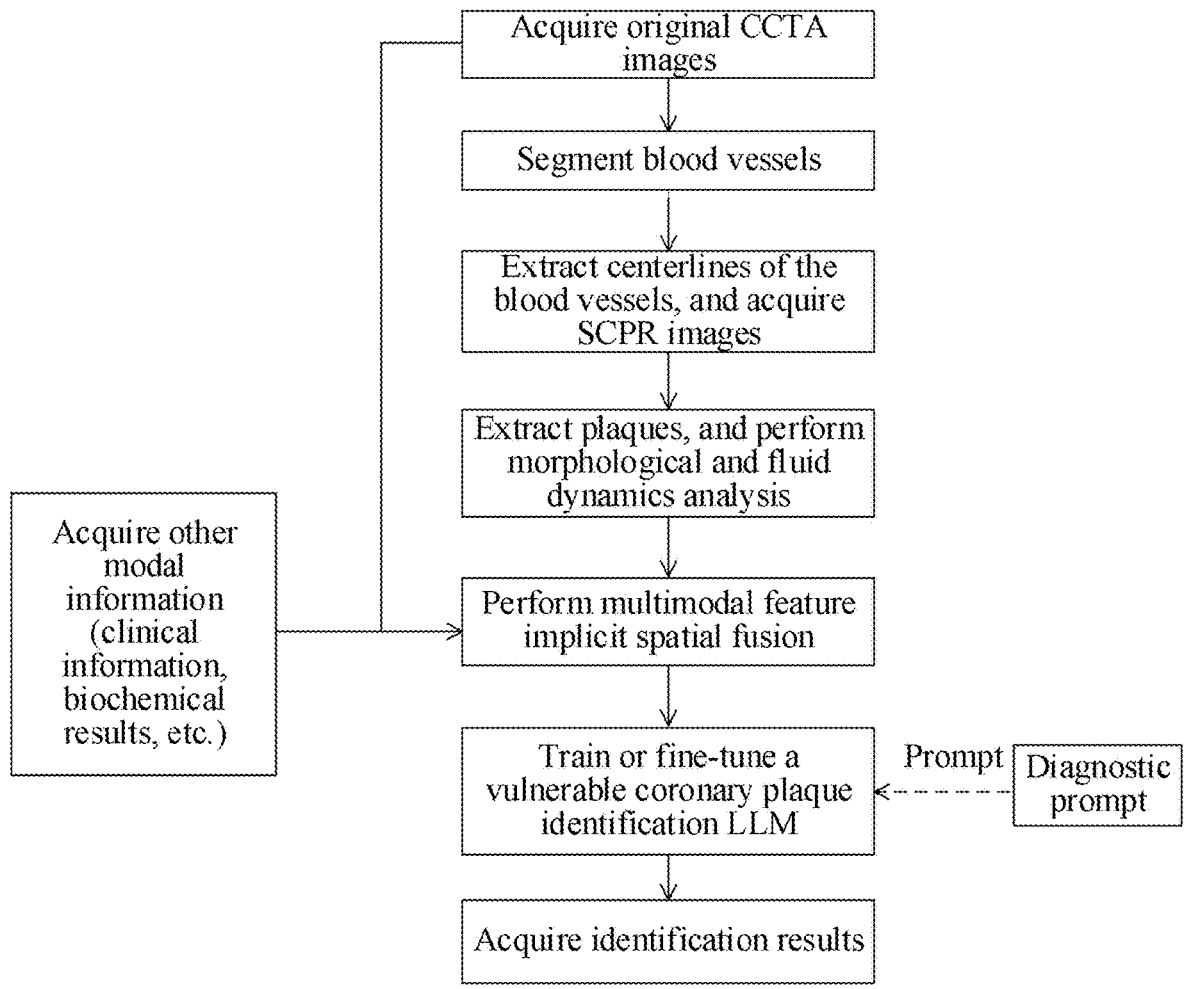
FIG. 1 is a flowchart of a method for identifying a vulnerable coronary plaque based on a multimodal large language model (MM-LLM) according to an embodiment of the present disclosure.

In order to make the objectives, technical solutions, and advantages of the embodiments of the present disclosure clearer, the technical solutions in the embodiments of the present disclosure are described in more detail below with reference to the drawings in the embodiments of the present disclosure. Reference numerals that are the same or similar throughout the drawings represent the same or similar elements or elements with the same or similar functions. The described embodiments are some rather than all of the embodiments of the present disclosure. The embodiments described below with reference to the drawings are exemplary. They are only used to explain the present disclosure, and should not be construed as a limitation to the present disclosure. All other embodiments obtained by those of ordinary skill in the art based on the embodiments of the present disclosure without creative efforts should fall within the protection scope of the present disclosure. The embodiments of the present disclosure are described in detail below with reference to the drawings.

It should be understood that in the description of the present disclosure, terms such as "center", "longitudinal", "transverse", "front", "rear", "left", "right", "vertical", "horizontal", "top", "bottom", "inside", and "outside" indicate the orientation or position relationships based on the drawings. They are merely intended to facilitate description of the present disclosure, rather than to indicate or imply that the mentioned device or elements must have a specific orientation and must be constructed and operated in a specific orientation. Therefore, these terms should not be construed as a limitation to the present disclosure.

FIG. 1 is a flowchart of a method for identifying a vulnerable coronary plaque based on a multimodal large language model (MM-LLM) according to an embodiment of the present disclosure.

As shown in FIG. 1, the method for identifying a vulnerable coronary plaque based on an MM-LLM includes the following steps.

A target three-dimensional (3D) coronary computed tomography angiography (CCTA) image and a target straightened curved planar reformation (SCPR) image are acquired.

Plaque mask information of a blood vessel is acquired based on the target SCPR image.

Basic plaque data is acquired based on the plaque mask information.

Fluid dynamics data of each plaque area is acquired based on the SCPR image.

Basic clinical testing information is acquired.

Image data, structural data, and textual data are standardized separately, and feature fusion is performed by a multimodal feature implicit spatial fusion method to acquire a first fusion feature.

A trained vulnerable plaque identification LLM is acquired.

The first fusion feature is input into the vulnerable plaque identification LLM to acquire an identification result.

In the present disclosure, the method for identifying a vulnerable coronary plaque based on an MM-LLM integrates a plaque feature, a fluid dynamics feature, and a text feature to solve the problems of poor single-image feature expression ability and low identification performance in traditional technologies.

In this embodiment, the target SCPR image is acquired as follows.

The blood vessel is segmented by a coronary artery segmentation model, and a centerline of a blood vessel mask is extracted to acquire the SCPR image.

In this embodiment, the plaque mask information on the blood vessel based on the target SCPR image is acquired as follows.

Based on the SCPR images, the plaque mask information on each segment of the blood vessel is acquired through a plaque segmentation model.

In this embodiment, the basic plaque data is acquired based on the plaque mask as follows.

Features including but not limited to edge information, length, weight, maximum diameter, density, and texture are acquired through morphological analysis methods. Fluid dynamics features such as flow velocity, flow rate, and shear force in each plaque area are acquired through CT fractional flow reserve (FFRCT) post-processing technology.

In this embodiment, clinical information includes the patient's basic information (such as height and weight), physical examination, self-reported symptoms, and past medical history. The biochemical result information mainly includes blood lipid levels (total cholesterol and triglycerides) and blood glucose levels (fasting blood glucose and glycated hemoglobin).

In this embodiment, the various data, specifically the image data (the original 3D CCTA image, the target SCPR image, and the plaque mask information), the structural data (basic plaque data and fluid dynamics data), and the textual data (clinical information and biochemical results), are fused. Due to the significant differences in the feature form and dimensional space among the three types of data, and the tendency for missing values, it is necessary to first use appropriate preprocessing methods for normalization and then fuse features through implicit spatial expression.

Specifically, in this embodiment, the image data (the target 3D CCTA image, the target SCPR image, and the plaque mask information) is processed as follows.

The image data is subject to conventional processing. That is, first, the image is scaled to a fixed size, and then normalization is performed to normalize the pixel value to the range of [0,1]. Finally, the image is encoded into fixed-dimensional feature vector V1 by a CNN or Transform.

In this embodiment, the structural data (the basic plaque data, the fluid dynamics data, etc.) is acquired as follows.

Structural data is subject to standardization processing, including but not limited to data cleaning (such as missing value processing, consistency checking, and outlier detection), data integration, normalization processing, and data encoding (one-hot encoding or label encoding), in order to convert the data into feature vector V2.

In this embodiment, the textual data (the basic clinical testing information, including biochemical results and clinical information) is acquired as follows.

For multidimensional clinical textual data, the Tokenizer class tool in the Transformers library is first used to convert the data into token combinations of varying lengths, and then feature extraction is performed on the tokens through an encoder (such as Transformer and bidirectional encoder representations from Transformers (BERT)) to acquire the text feature vector V3.

In this embodiment, the feature vectors V1, V2, and V3 are fused through implicit spatial encoding as follows.

Figure 3:
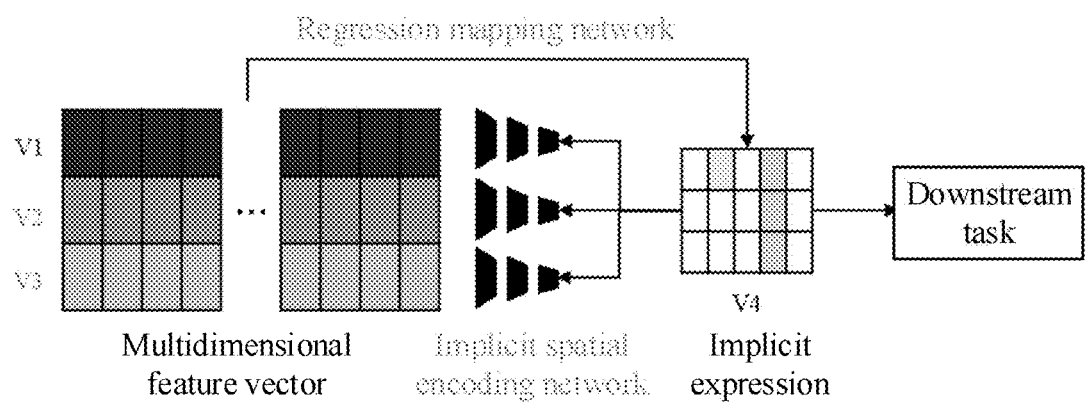
FIG. 3 is a schematic diagram of a technical solution for feature fusion by a regression mapping network and an implicit spatial encoding network according to the present disclosure.

As shown in FIG. 3, an implicit spatial encoding network is trained to extract common features of the multidimensional features V1, V2, and V3, thereby acquiring complete implicit feature expression V4. The implicit spatial encoding network includes three multi-layer convolutional networks with weights that are not shared. Training is conducted using a self-supervised method, with loss terms including reverse reconstruction loss and category loss of the feature V4.

Since V4 is a complete expression of the multidimensional features V1, V2, and V3, in order to maintain consistency between training and inference, another regression mapping network is trained to achieve the correspondence between the multidimensional features and V4. In the inference stage, the multidimensional features are mapped to hidden space features through the regression mapping network and input into a downstream task to achieve the final goal.

In this embodiment, the method for identifying a vulnerable coronary plaque based on an MM-LLM further includes the following step.

The pre-trained vulnerable plaque identification LLM is fine-tuned.

In this embodiment, the vulnerable plaque identification LLM is trained or fine-tuned as follows.

The training of the LLM is guided through a prompt method, and prompts are extracted from the diagnostic results. Depending on the final output target, extractable prompts include but are not limited to plaque size, location, vulnerability, level of danger, and diagnostic opinions.

Due to the diagnostic results being textual data, in addition to manually extracting tokens, the text can be converted into a token combination using a Tokenizer class tool, and feature vector V5 is acquired by an encoder. When the vulnerable plaque identification LLM is trained, the fine-tune method is used to fine-tune the existing pre-trained MM-LLMs (GPT-Vision, PaLM-E, etc.) by applying the third feature vector and the fourth feature vector.

In this embodiment, the pre-trained vulnerable plaque identification LLM is fine-tuned as follows.

A 3D CCTA image, SCPR image, and plaque mask information for training are acquired.

Basic plaque data and fluid dynamics data for training are acquired.

Basic clinical testing information data for training is acquired.

The 3D CCTA image, SCPR image, and plaque mask information for training are preprocessed separately to acquire a first feature vector.

Second preprocessing is performed on the basic plaque data and fluid dynamics data for training separately to acquire a second feature vector.

The basic clinical testing information data for training is preprocessed to acquire a third feature vector The pre-trained vulnerable plaque identification LLM is fine-tuned based on the first feature vector, the second feature vector, and the third feature vector.

In this embodiment, the 3D CCTA image, SCPR image, and plaque mask information for training are reprocessed separately to acquire the first feature vector as follows.

The 3D CCTA image, SCPR image, and plaque mask information are formatted separately to acquire formatted images for training.

Each of the formatted images for training is normalized to form a normalized image.

Feature extraction is performed on the normalized image to acquire the first feature vector.

In this embodiment, the second preprocessing is performed on the basic plaque data and fluid dynamics data for training separately to acquire the second feature vector as follows.

The basic plaque data and fluid dynamics data for training are cleaned separately to acquire cleaned data.

The cleaned data is normalized to acquire normalized data.

The normalized data is encoded to acquire the second feature vector.

In this embodiment, the basic clinical testing information data for training is preprocessed to acquire the third feature vector as follows.

The basic clinical testing information data for training is converted by a Tokenizer class tool in a Transformers library into a token combination.

Feature extraction is performed by an encoder on the token combination to acquire the third feature vector.

In this embodiment, the pre-trained vulnerable plaque identification LLM is fine-tuned based on the first feature vector, the second feature vector, and the third feature vector as follows.

The first feature vector, the second feature vector, and the third feature vector are fused by an implicit spatial encoding network to generate a fourth feature vector.

A regression mapping network is acquired.

The regression mapping network is trained based on the fourth feature vector to acquire a trained regression mapping network.

Diagnostic result data is acquired.

Feature extraction is performed on the diagnostic result data to acquire a fifth feature vector. Specifically, the extraction of the prompts is completed by a text conversion method, converting the text into token combinations of different lengths, and the fifth feature vector is acquired by the encoder. The prompts have some redundancy. During training, feature dropout is performed to randomly discard some unimportant prompts.

The pre-trained vulnerable plaque identification LLM is fine-tuned based on the fourth feature vector and the fifth feature vector.

In this embodiment, the pre-trained vulnerable plaque identification LLM is fine-tuned based on the fourth feature vector and the fifth feature vector as follows.

Multiple rounds of training are performed in advance on the pre-trained vulnerable plaque identification LLM based on the fourth feature vector.

After the multiple rounds of training is completed in advance, a parameter of a fusion module is frozen according to a preset step.

The fourth feature vector is compared with the fifth feature vector to train the vulnerable plaque identification LLM, thereby acquiring the trained vulnerable plaque identification LLM.

For example, for the comparative training using the fourth feature vector and the fifth feature vector, the fourth feature vector is first trained for multiple rounds, and the parameters of the fusion module are frozen at a certain step (such as step=10). Thus, the fourth feature vector is compared with the fifth feature vector for training to acquire the LLM. An asynchronous training method is used to enable faster multimodal information fusion and easier convergence of LLM training.

Training the LLM from scratch and fine-tuning both require the above training process.

The present disclosure further provides an apparatus for identifying a vulnerable coronary plaque based on an MM-LLM. The apparatus for identifying a vulnerable coronary plaque based on an MM-LLM includes: an image acquisition module, a plaque mask identification module, a basic plaque identification module, a fluid dynamics data acquisition module, a basic clinical testing information acquisition module, a first fusion data acquisition module, a first fusion feature acquisition module, a vulnerable plaque identification LLM acquisition module, and an identification result identification module.

The image acquisition module is configured to acquire a target 3D CCTA image and a target SCPR image.

The plaque mask identification module is configured to acquire plaque mask information of a blood vessel based on the target SCPR image.

The basic plaque identification module is configured to acquire basic plaque data based on the plaque mask information.

The fluid dynamics data acquisition module is configured to acquire fluid dynamics data of each plaque area based on the SCPR image.

The basic clinical testing information acquisition module is configured to acquire basic clinical testing information.

The first fusion data acquisition module is configured to standardize image data, structural data, and textual data separately, and perform, by a multimodal feature implicit spatial fusion method, feature fusion to acquire a first fusion feature.

The vulnerable plaque identification LLM acquisition module is configured to acquire a trained vulnerable plaque identification LLM.

The identification result identification module is configured to input the first fusion feature into the vulnerable plaque identification LLM to acquire an identification result.

It should be noted that the above explanations for the method embodiment are also applicable to the device embodiment, and will not be repeated here.

The present disclosure further provides an electronic device, including a memory, a processor, and a computer program stored on the memory and executable on the processor, where when the processor is configured to execute the computer program, so as to implement the above method for identifying a vulnerable coronary plaque based on an MM-LLM.

The present disclosure further provides a computer-readable storage medium. The computer-readable storage medium is configured to store a computer program; and the computer program is executed by a processor to implement the above method for identifying a vulnerable coronary plaque based on an MM-LLM.

Figure 2:
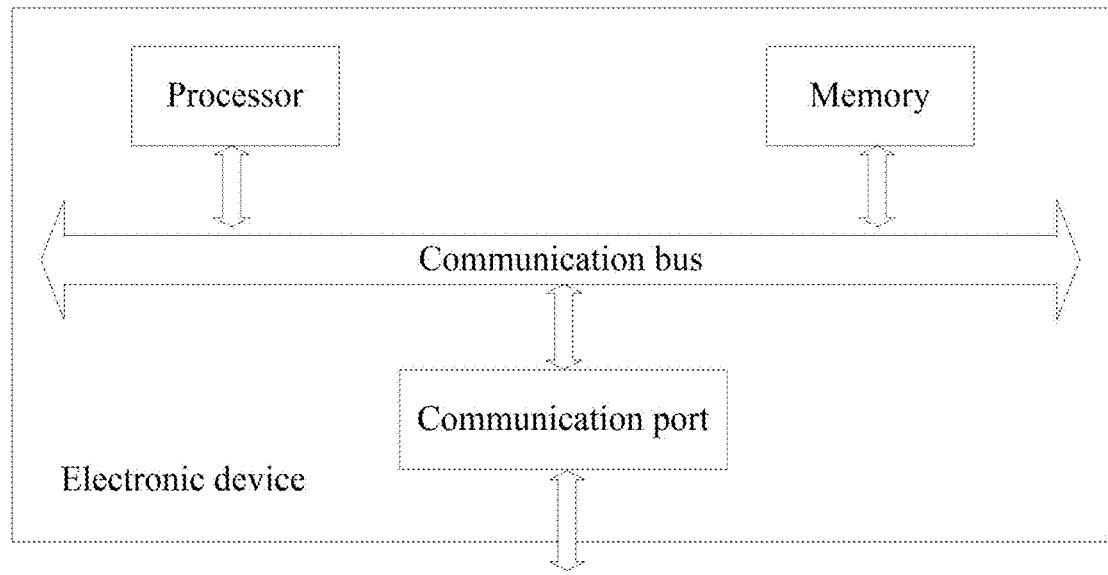
FIG. 2 is a structural diagram of an electronic device according to an embodiment of the present disclosure.

FIG. 2 is an exemplary structural diagram of an electronic device for implementing the method for identifying a vulnerable coronary plaque based on an MM-LLM according to an embodiment of the present disclosure.

As shown in FIG. 2, the electronic device includes input device 501, input interface 502, central processing unit 503, memory 504, output interface 505, and output device 506. The input interface 502, the central processing unit 503, the memory 504, and the output interface 505 are connected to each other through bus 507. The input device 501 and the output device 506 are respectively connected to the bus 507 through the input interface 502 and the output interface 505, thereby being connected to other components of the electronic device. Specifically, the input device 504 is configured to receive outside input information and transmit the input information to the central processing unit 503 through the input interface 502. The central processing unit 503 is configured to process the input information based on a computer-executable instruction stored in the memory 504 to generate output information, temporarily or permanently store the output information in the memory 504, and transmit the output information to the output device 506 through the output interface 505. The output device 506 is configured to output the output information of the electronic device to a user.

That is to say, the electronic device shown in FIG. 2 may include: a memory for storing a computer-executable instruction; and one or more processors, where the one or more processors are configured to execute the computer-executable instruction, so as to implement the method for identifying a vulnerable coronary plaque based on an MM-LLM, as shown in FIG. 1.

In an embodiment, the electronic device shown in FIG. 2 may include: memory 504 for storing an executable program code; and one or more processors 503 for running the executable program code stored in the memory 504 so as to implement the method for identifying a vulnerable coronary plaque based on an MM-LLM in the above embodiment.

In a typical configuration, the computing device includes one or more CPUs, an input/output (I/O) interface, a network interface and a memory.

The memory may include a non-persistent memory, an RAM and/or a non-volatile memory in computer-readable media, such as a read only memory (ROM) or a flash RAM. The memory is an example of computer-readable media.

The computer-readable medium includes persistent, non-persistent, removable, and non-removable media, and storage of information may be implemented by any method or technology. The information may be computer-readable instructions, data structures, modules of programs, or other data. Examples of the computer storage medium include, but are not limited to, a phase-change random access memory (PRAM), a static random access memory (SRAM), a dynamic random access memory (DRAM), other types of RAMs, a ROM, an electrically erasable programmable read-only memory (EEPROM), a flash memory or another memory technology, a CD-ROM, a digital versatile disk (DVD) or other optical storage devices, a magnetic cassette tape, and a magnetic tape disk storage device or other magnetic storage devices or any other non-transmission medium that can be used to store information that can be accessed by a computing device.

Those skilled in the art should understand that the embodiments of the present disclosure may be provided as a method, a system, or a computer program product. Therefore, the present disclosure can take the form of an entire hardware embodiment, an entire software embodiment, or an embodiment combining software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

In addition, it is apparent that the word "including" does not exclude other units or steps. The multiple units, modules or apparatuses stated in the apparatus claims may also be implemented by a unit or a master apparatus through software or hardware.

The flowcharts and block diagrams in the drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that, in some alternative implementations, the functions marked in the blocks may alternatively occur in a different order from that marked in the drawings. For example, two successively marked blocks actually may be executed in parallel substantially, or may be executed in reverse order sometimes, depending on the functions involved. It should also be noted that, each block in the block diagram and/or flowchart and the combination of the blocks in the block diagram and/or the general flowchart may be implemented by a dedicated hardware-based system that performs a defined function or operation, or may be implemented by a combination of dedicated hardware and computer instructions.

Those skilled in the art should understand that the embodiments of the present disclosure may be provided as a method, a system, or a computer program product. Therefore, the present disclosure can take the form of an entire hardware embodiment, an entire software embodiment, or an embodiment combining software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

In addition, it is apparent that the word "including" does not exclude other units or steps. The multiple units, modules or apparatuses stated in the apparatus claims may also be implemented by a unit or a master apparatus through software or hardware.

The present disclosure is described above through preferred embodiments, but the preferred embodiments are not intended to limit the present disclosure. Those skilled in the art may make possible changes and modifications without departing from the spirit and scope of the present disclosure. Therefore, the protection scope of the present disclosure should be based on the scope defined by the claims of the present disclosure.

Finally, it needs to be noted that the above embodiments are only used to explain the technical solutions of the present disclosure, and are not intended to limit the same. Although the present disclosure is described in detail with reference to the above embodiments, those of ordinary skill in the art should understand that they can still make modifications to the technical solutions described in the above embodiments, or make equivalent substitutions for some technical features therein. These modifications or substitutions do not make the essence of the corresponding technical solutions deviate from the spirit and scope of the technical solutions of the embodiments of the present disclosure.

What is claimed is:

1. A method for identifying a vulnerable coronary plaque based on a multimodal large language model (MM-LLM), comprising:
   acquiring a target three-dimensional (3D) coronary computed tomography angiography (CCTA) image and a target straightened curved planar reformation (SCPR) image;
   acquiring plaque mask information of a blood vessel based on the target SCPR image;
   acquiring plaque data based on the plaque mask information;
   acquiring fluid dynamics data of each plaque area based on the target SCPR image;
   acquiring clinical testing information;
   standardizing above image data, structural data, and textual data separately, and performing, by a regression mapping network, feature fusion to acquire a first fusion feature;
   acquiring a trained vulnerable plaque identification LLM; and
   inputting the first fusion feature into the trained vulnerable plaque identification LLM to acquire an identification result.

2. The method for identifying the vulnerable coronary plaque based on the MM-LLM according to claim 1, wherein the acquiring the trained vulnerable plaque identification LLM comprises:
   acquiring a pre-trained vulnerable plaque identification LLM; and
   fine-tuning the pre-trained vulnerable plaque identification LLM to acquire the trained vulnerable plaque identification LLM.

3. The method for identifying the vulnerable coronary plaque based on the MM-LLM according to claim 2, wherein the fine-tuning the pre-trained vulnerable plaque identification LLM to acquire the trained vulnerable plaque identification LLM comprises:
   acquiring a 3D CCTA image, SCPR image, and plaque mask information for training;
   acquiring plaque data and fluid dynamics data for training;
   acquiring clinical testing information data for training;
   preprocessing the 3D CCTA image, SCPR image, and plaque mask information for training separately to acquire a first feature vector;
   performing second preprocessing on the plaque data and fluid dynamics data for training separately to acquire a second feature vector;
   preprocessing the clinical testing information data for training to acquire a third feature vector; and
   fine-tuning the pre-trained vulnerable plaque identification LLM based on the first feature vector, the second feature vector, and the third feature vector.

4. The method for identifying the vulnerable coronary plaque based on the MM-LLM according to claim 3, wherein the preprocessing the 3D CCTA image, SCPR image, and plaque mask information for training separately to acquire the first feature vector comprises:
   formatting the 3D CCTA image, SCPR image, and plaque mask information separately to acquire formatted images for training;
   normalizing each of the formatted images for training to form a normalized image; and
   performing feature extraction on the normalized image to acquire the first feature vector.

5. The method for identifying the vulnerable coronary plaque based on the MM-LLM according to claim 4, wherein the performing the second preprocessing on the plaque data and fluid dynamics data for training separately to acquire the second feature vector comprises:
   cleaning the plaque data and fluid dynamics data for training separately to acquire cleaned data;
   normalizing the cleaned data to acquire normalized data; and
   encoding the normalized data to acquire the second feature vector.

6. The method for identifying the vulnerable coronary plaque based on the MM-LLM according to claim 5, wherein the preprocessing the clinical testing information data for training to acquire the third feature vector comprises:
   converting, by a Tokenizer class tool in a Transformers library, the clinical testing information data for training into a token combination; and
   performing, by an encoder, feature extraction on the token combination to acquire the third feature vector.

7. The method for identifying the vulnerable coronary plaque based on the MM-LLM according to claim 6, wherein the fine-tuning the pre-trained vulnerable plaque identification LLM based on the first feature vector, the second feature vector, and the third feature vector comprises:
   fusing, by an implicit spatial encoding network, the first feature vector, the second feature vector, and the third feature vector to generate a fourth feature vector;
   acquiring the regression mapping network;
   training the regression mapping network based on the fourth feature vector to acquire a trained regression mapping network;
   acquiring diagnostic result data;
   performing feature extraction on the diagnostic result data to acquire a fifth feature vector; and
   fine-tuning the pre-trained vulnerable plaque identification LLM based on the fourth feature vector and the fifth feature vector.

8. The method for identifying the vulnerable coronary plaque based on the MM-LLM according to claim 7, wherein the fine-tuning the pre-trained vulnerable plaque identification LLM based on the fourth feature vector and the fifth feature vector comprises:
   performing multiple rounds of training in advance on the pre-trained vulnerable plaque identification LLM based on the fourth feature vector;
   freezing, after completing the multiple rounds of training in advance, a fusion parameter according to a preset step;
   comparing the fourth feature vector with the fifth feature vector to train the pre-trained vulnerable plaque identification LLM after multiple rounds of training in advance, thereby acquiring the trained vulnerable plaque identification LLM.

* * * * *